United States Patent [19]

Carrow

[11] 3,902,532
[45] Sept. 2, 1975

[54] HIGH HOOP-STRESS PIPE
[75] Inventor: Guy E. Carrow, Bartlesville, Okla.
[73] Assignee: Phillips Petroleum Company, Bartlesville, Okla.
[22] Filed: July 8, 1974
[21] Appl. No.: 486,684

Related U.S. Application Data

[63] Continuation-in-part of Ser. No. 234,317, Mar. 13, 1972.

[52] U.S. Cl. ............ 138/177; 138/DIG. 7; 161/139; 161/247; 161/411; 252/511; 260/41 R
[51] Int. Cl. .......................... F16l 9/12; C08f 45/08
[58] Field of Search.............. 138/177, 178, DIG. 7; 260/41 R; 252/510, 511; 161/247, 139, 411

[56] References Cited
UNITED STATES PATENTS

| | | | |
|---|---|---|---|
| 2,316,706 | 4/1943 | Mueller-Cunradi et al. | 260/42.46 |
| 3,164,796 | 1/1965 | Dixon | 252/510 |
| 3,206,419 | 9/1965 | Pritchard et al. | 260/29.1 R |
| 3,455,865 | 7/1969 | Bolt et al. | 117/6 |
| 3,492,310 | 1/1970 | Carrow | 260/33.4 |
| 3,703,565 | 11/1972 | Hoblit et al. | 260/878 B |

FOREIGN PATENTS OR APPLICATIONS

1,044,503  10/1966  United Kingdom

OTHER PUBLICATIONS

Encyclopedia of Polymer Science and Technology, Vol. 6, John Wiley & Sons, 1967, pp. 358–362.

Primary Examiner—Richard E. Aegerter
Assistant Examiner—L. Footland

[57] ABSTRACT

Pipe formed from high-density high-molecular weight poly(1-monoolefin) compositions containing small amounts of graphite exhibits high hoop-stress life. In addition, the compositions can contain carbon black and a slip agent.

13 Claims, No Drawings

HIGH HOOP-STRESS PIPE

RELATED INVENTION

This application is a continuation-in-part application of a copending application having Ser. No. 234,317, filed Mar. 13, 1972, now allowed.

FIELD OF THE INVENTION

This invention relates to high molecular weight poly(1-monoolefin)-graphite compositions. This invention further relates to pipe exhibiting high hoop-stress properties.

BRIEF SUMMARY OF THE INVENTION

According to my invention, there are provided compositions of high molecular weight high density poly(1-monoolefin)s blended or compounded with graphite.

Extruded hollow forms, particularly substantially rigid tubular forms such as pipe, prepared from these graphite-containing high density high molecular weight poly(1-monoolefin)s compositions exhibit unexpectedly high hoop-stress life by considerable margins as compared to pipe prepared from poly(1-monoolefin)s not containing the graphite.

DETAILED DESCRIPTION OF THE INVENTION

I have discovered that unique compositions of a minor amount of graphite and a major amount of high density poly(1-monoolefin)s, more particularly the extra-high molecular weight polymers characterized by a high load melt index below about 5 but not less than 0.1, such as high density, high molecular weight polyethylene, can be shaped or extruded into various substantially rigid tubular forms such as pipe which exhibit surprisingly high hoop-stress life.

Polymers

Broadly, the polymers useful in the context of my invention are high molecular weight polymers of 1-monoolefins. These poly(1-monoolefin)s include homopolymers or copolymers of 1-monoolefins containing from 2 to 12, presently preferably 2 to 6 for commercial availability, carbon atoms per molecule, such as ethylene, propylene, butylene, pentene, hexene, cyclooctene, octene, dodecene, or polymerizable skeletal isomers thereof. These monomers can be polymerized as homopolymers of any one monomer, copolymers of any two or three or more, and the like, such as the presently preferred ethylene homopolymers, ethylene-butene copolymers, and ethylene-hexene copolymers.

The high molecular weight high density poly(1-monoolefin)s can be prepared by means known to the polymer arts using a supported metal oxide catalyst, such as chromium oxide; or by the use of transition metal halides and organo-metal compound catalysts; or other methods known in the art.

In general, the high molecular weight high density polymers which presently are considered most suitable for my invention are those high molecular weight polymers of 1-olefins with a high load melt index (HLMI) below 5 but not less than about 0.1, preferably at least about 0.5, more preferably about 1 to 5, as determined by ASTM Method D 1238–65T Condition F.

It is presently preferred that the molecular weight of the poly(1-monoolefin)s, as determined by gel permeation chromatography, be within the broad range of 200,000 to 1,000,000, more preferably 250,000 to 800,000, still more preferably from 300,000 to 500,000, as measured by methods known to the arts such as on Waters Associates, Inc. Instruments. The presently preferred polymers have a density of about 0.94 to 0.97 by ASTM Method D 1505–68.

Graphite

According to said copending application, the graphite content of the poly(1-monoolefin)-graphite compositions of my invention range broadly from about 1 to 10 weight percent relative to the weight of poly(1-monoolefin) alone, excluding weight of other additives incorporated into the composition for various purposes, as well as fillers, colorants, and the like. Presently preferred for commercial purposes, according to said copending application, are compositions containing a graphite content of about 2 to 6 percent by weight on the same basis.

In accordance with the invention, it has now been found that tubular form pipe exhibiting high hoop-stress life when subjected to a hoop-stress of at least 1,000 pounds and a temperature of about 150F can be prepared from high molecular weight high density polyolefins containing 0.5 to 3 weight percent graphite. It has been further found that high molecular weight high density polyolefin compositions containing small amounts of graphite and like amounts of carbon black can be formed into tubular pipe exhibiting high hoop-stress life.

As is demonstrated by the specific working examples hereinbelow, polyolefin compositions, especially polyethylene, ethylene-butene copolymers, and ethylene-hexene copolymers, containing 0.5 to 3 weight percent graphite or such compositions also containing 1 to 3 weight percent carbon black can be shaped or extruded into rigid tubular form such as pipe which exhibits surprisingly high hoop-stress life in comparison with pipe formed from polyolefin compositions containing only carbon black. Moreover, as demonstrated by the specific working examples, particularly effective polyolefin compositions containing both graphite and carbon black are obtained for the formation of pipe having excellent high hoop-stress properties when the total content of carbon black and graphite together did not exceed about 4 weight percent relative to the weight of the polymer resin itself.

Graphite, sometimes termed black lead or plumbago, commonly is described as a crystalline allotropic form of carbon characterized by hexagonal arrangement of atoms. Graphite also is produced synthetically from petroleum coke and sometimes is known as pyrographite or pyrolytic graphite. Commerically available are various graphite forms including crystalline types, the pyrolytic type, and also an amorphous form from some areas in the world.

Graphite can be incorporated into the described high melt index polymers by such means as a compounding extruder and pelletizer, Banbury mixer, or other equipment for compounding additives into thermoplastic materials. Preferred is a finely divided or powdered graphite. The graphite can be added for convenience at the same time as are other additives such as antioxidants, colorants, stabilizers, and the like.

Other Additives

Various other additives can be used to impart other desirable properties to the polymeric compositions of this invention, such as improving oxidative stability, light stability, weatherability, or to add fungicides, corrosion inhibitors, and the like. Various additives also can be added including fillers, colorants, and the like, and including, particularly for preparataion of pipe, the use of carbon black such as to the extent of about 0.5 to 8 weight percent, preferably 1 to 5 weight percent, based on the weight of polymer excluding other additives.

In general, as set forth in said copending application, presently preferred for commercial purposes are compositions of poly(1-monoolefin)s wherein the total content of carbon black and graphite together does not exceed about 10 weight percent relative to the weight of the polymer resin itself. As demonstrated by the working examples below, currently preferred are compositions of polyolefins such as polyethylene, ethylene-butene copolymers, and ethylene-hexene copolymers wherein the total content of carbon black and graphite together does not exceed about 4 weight percent relative to the weight of the polymer resin itself.

Various processing aids can be incorporated into the resin for various purposes. Particularly desirable for dynamic extrusion purposes are slip agents such as glycerin or an amide of a higher fatty acid, or both, to improve extrusion properties.

High molecular weight high density poly(1-monoolefin)s, while tough, require specialized processing techniques such as the use of dynamic extruders. Frequently, glycerin or amides, or both, are added as slip agents to the raw resin, or to the resin compounded with carbon black or the like. The amides of saturated and/or unsaturated substantially water insoluble aliphatic monocarboxylic acids are useful such as those of acids having from 10 to 22 carbon atoms in the molecule such as are present as free acids or glycerides in fatty oils. Typical fatty acid amides include the amides of lauric acid, myristic acid, palmitic acid, stearic acid, oleic acid, and linoleic acid, alone or in admixture.

The amount of glycerine used ranges from about 0.5 to 1.5 percent by weight of the extrusion composition. An amide can be added in an amount ranging from about 0.1 to 1 percent by weight of the extrusion composition. The glycerine and amide can be incorporated by dry blending, that is, by mixing the additives with the granular or pelleted resin, for example, as by tumbling or by precompounding in a Banbury mixer or a Farrow continuous mixer, and the like.

EXAMPLES

Materials used in the following examples, proportions, particular specific components, and the like, are intended illustrative of my invention and not limitedly of the reasonable scope thereof.

To illustrate the unusual nature and highly desirable properties of my compositions, pipe was formed from my compositions and also from control compositions for comparison, by dynamic extrusion, a process of extrusion utilizing repeated pressure impulses and a long land die. Such methods of extrusion are particularly helpful in extruding high density, high molecular weight poly(1-monoolefin)s.

EXAMPLE I

An ethylene-butene-1 copolymer, density 0.942, high load melt index 1 (ASTM D 1238–65T Condition F), molecular weight as determined by gel permeation chromotography of about 400,000, was compounded with 0.1 percent by weight of a known stabilizer 4,4-thiobis(6-tert-m-cresol), 0.8 weight percent glycerol, and 2.5 weight percent of a 200 mesh graphite powder in a Banbury mixer. The control runs were prepared similarly, using the same polymer, but employing 2.5 weight percent carbon black rather than graphite. Each composition was comminuted by a chopper into granules.

One-inch schedule 40 pipe then was extruded. Sections of pipe prepared from the compositions were subjected to long-term hoop-stress testing according to ASTM Method D 1598–58T. The results are tabulated below and compared with standard pipe samples from production line resin without the added graphite:

TABLE I

| Run | Weight % Additive Graphite | Weight % Additive Carbon Black | Hoop Stress, psi | Hours to Failure of Pipe Under Long-Term Hoop Stress and 150° F |
|---|---|---|---|---|
| 1 | 2.5 | 0 | 1200 | 87.9 |
| 2 | 0 | 2.5 | 1200 | 0.4 |
| 2A | 0 | 2.5 | 1200 | 260 |
| 3 | 2.5 | 0 | 1100 | 6360 |
| 4 | 0 | 2.5 | 1100 | 10 |
| 4A | 0 | 2.5 | 1100 | 837 |
| 5 | 2.5 | 0 | 1000* | 12936 |
| 6 | 0 | 2.5 | 1000 | 300 |
| 6A | 0 | 2.5 | 1000 | 2280 |
| 7 | 2.5 | 0 | 900 | 16248 |
| 8 | 0 | 2.5 | 900 | >12000 (est.) |
| 8A | 0 | 2.5 | 900 | 7224 |

*1000 Hoop Stress = about 225 psig internal pressure.
Runs 2A, 4A, 6A, and 8A were made with the polymer described in Example II which differs slightly from the polymer of Example I, but is considered equivalent.

The above data fully illustrate the unexpectedly improved nature of my polyolefin-graphite compositions.

EXAMPLE II

An ethylene-butene-1 copolymer, molecular weight of about 400,000, density 0.941, and HLMI = 1 (high load melt index), was compounded with 0.9 weight percent glycerine and varying amounts of carbon black and graphite as indicated in Table II below.

One-inch schedule 40 pipe was extruded from the ethylene-butene-1 copolymer compositions. Sections of pipe prepared from the compositions were subjected to long-term hoop-stress testing according to ASTM D–1598–58T and short-term rupture testing according to ASTM D–1599–58T. The results are tabulated below in Table II:

TABLE II

| Pipe Sample No. | Additive to Polyethylene Wt. Percent | | Short-Time* Rupture Strength, lb/in² | Hours to Failure of Pipe Under Long-Term Hoop-Stress, lb/in²** & 150° F | | | | |
|---|---|---|---|---|---|---|---|---|
| | Carbon Black | Graphite | | 1200 | 1100 | 1000*** | 900 | 900 |
| 1 | 2.5 | 0 | 810 | 260 | 837 | 2280 | 2424 | 7224 |
| 2 | 2.0 | 0.5 | 800 | 70.2 | 1680 | 2016 | 5040 | >7900 (no failure) |
| 3 | 1.5 | 1.0 | 800 | 65.0 | 1752 | 5064 | 2569 | 4392 |
| 4 | 2.0 | 1.0 | 800 | 105.7[b] | 552[a] | 6648 | 2208 | 4464 |
| 5 | 2.0 | 1.0 | 800 | 13.5[b] | 3552 | 13048 | — | 10368 |
| 6 | 0 | 2.5 | 780 | 87.9 | 6360 | 12936 | 16896 | 16248 |

*ASTM D-1599-58T.
**ASTM D-1598-58T.
***1000 lb. Hoop stress = about 225 psig internal pressure.
[a]Failed near the fitting - apparently the pipe was weakened while it was put on test. Equivalent Sample 5 behaves as expected.
[b]Samples 4 and 5 had the same composition and at 1200 psi 5 failed early while the other (4) was much better.

Referring to the above table, it can be seen that all blends had very nearly the same short-time rupture strength. In addition, while not every long-term stress test in the table was consistent, overall the blends containing graphite were better than Run 1 containing only carbon black. It will also be observed that Run 6 containing graphite only was excellent at all test pressures below 1200 psi. In general, based upon the data above, the blends containing graphite exhibited high hoop-stress life when subjected to a hoop-stress of at least 1000 pounds.

EXAMPLE III

A high molecular weight high density ethylene-butene-1 copolymer, density 0.941, high load melt index 1.0, molecular weight about 400,000, was compounded with 0.9 weight percent glycerine and 2.5 weight percent carbon black and varying amounts of graphite ranging from 0.5 weight percent to one weight percent.

One-inch schedule 40 pipe was extruded from the polyethylene resin. Sections of pipe prepared from the compositions were subjected to long-term hoop-stress testing according to ASTM D 1598–58T. The results are tabulated below in Table III:

TABLE III

| Pipe Sample No. | Additive Concentration Wt.% | | Hours to Failure of Pipe Under Long-Term Hoop-Stress & 150F | | | |
|---|---|---|---|---|---|---|
| | Carbon Black | Graphite | 1050 psi Stress | | 1000 psi Stress** | |
| 1 | 2.5 | 1 | 2160 | (average) | >3600 | (no failure) |
| 2 | 2.5 | 1 | >2928 | | >2928 | (no failure) |
| 3 | 2.5 | 0.5 | 1904 | | 2288 | (average) |
| 4 | 2.5 | 0.5* | 2840 | (average) | 6534 | (average) |
| 5 | 2.5 | 0 | — | | 2280 | |

*50-50 blend of resin containing 1 percent by weight graphite and resin containing no graphite.
**1000-lb. hoop stress = 225 to 230 psig internal pressure.

In the above table values indicated as being average are average values obtained for three runs. It will also be noted that Samples 1 and 2 subjected to 1000 psi stress and Sample 2 subjected to 1050 psi stress did not fail and tests were terminated after the indicated lapse of time.

Run 5 in Table III corresponds to Run 1 in Table II. Both resins are the same polymer but different production lots.

The data in Table III demonstrate that pipe containing one percent by weight graphite and 2.5 weight percent carbon black is considerably better than pipe containing no graphite at 1000 psi stress. It will also be noted that Run 4 which is a physical 50—50 blend containing 0.5 weight percent graphite gave better results than the compounded 0.5 weight percent blend of Run 3. As can be seen from the data in Table III, as little as 0.5 weight percent graphite has a beneficial effect when compounded with polyolefins containing carbon black which are formed into pipe exhibiting high hoop-stress life.

Variations and modifications of my invention can be made, as will be apparent to one skilled in the art, yet without parting from the intended spirit and scope of my disclosure including the claims as here appended.

I claim:

1. A tubular form pipe exhibiting high hoop-stress life when subjected to a hoop stress of at least 1000 pounds and a temperature of about 150F prepared from a composition consisting essentially of at least one high molecular weight high density poly(1-monoolefin) selected from homopolymers and copolymers of 1-monoolefins having from 2 to 12 carbon atoms per molecule and graphite, said poly(1-monoolefin) being characterized by a high load melt index of less than 5 but not less than 0.1, said graphite being present to the extent of about 0.5 to about 3 weight percent relative to the weight of said poly(1-monoolefin).

2. A tubular form pipe as defined in claim 1 wherein said high molecular weight, high density poly(1-monoolefin) is further characterized by a molecular weight of 200,000 to 1,000,000, a density of 0.94 to 0.97, and a high load melt index of 0.5 to 5.

3. The pipe defined by claim 1 further containing from about 0.5 to about 8 weight percent of carbon black relative to the weight of said poly(1-monoolefin) wherein the total content of said graphite and of said carbon black together do not exceed about 10 weight percent relative to the weight of said poly(1-monoolefin).

4. The pipe defined by claim 1 further containing about 1 to about 3 weight percent carbon black and wherein the total content of said graphite and of said carbon black together do not exceed about 4 weight percent relative to the weight of said poly(1-monoolefin).

5. The pipe defined by claim 1 further containing 1 to 3 weight percent carbon black and a slip agent wherein said slip agent is glycerine, an amide of a higher fatty acid, or both, and wherein the amount of glycerine present is 0.5 to 1.5 weight percent and the amount of amide present is 0.1 to 1 weight percent.

6. A pipe defined by claim 1 further incorporating a slip agent, said slip agent is a glycerol, an amide of a higher fatty acid, or both, and wherein the amount of glycerin present is 0.5 to 1.5 weight percent and the amount of amide present is 0.1 to 1 weight percent.

7. The pipe defined by claim 1 wherein said poly(1-monoolefin) is polyethylene, an ethylene-butene copolymer, or an ethylene-hexene copolymer.

8. The pipe defined by claim 1 wherein said poly(1-monoolefin) is an ethylene-butene copolymer containing 2.5 weight percent graphite and 0.8 weight percent glycerol.

9. The pipe defined by claim 1 wherein said polyolefin is polyethylene, an ethylene-butene copolymer or an ethylenehexene copolymer, and further wherein said compositions contain from 1 to 3 weight percent carbon black and a slip agent wherein said slip agent is glycerine, an amide of a higher fatty acid, or both, and wherein the amount of glycerine present is 0.5 to 1.5 weight percent, and the amount of amide present is 0.1 to 1 weight percent.

10. A tubular form pipe exhibiting high hoop-stress life prepared from a high molecular weight high density poly(1-monoolefin) selected from the group consisting of polyethylene and ethylene-butene copolymers containing up to 10 weight percent butene and about 2.5 weight percent graphite relative to the weight of said poly(1-monoolefin), said poly(1-monoolefin) being characterized by a high load melt index of 0.5 to 5, a molecular weight of 200,000 to 1,000,000, and a density of 0.94 to 0.97.

11. The pipe defined by claim 10 further containing from 0.5 to 8 weight percent of carbon black relative to the weight of said poly(1-monoolefin) and wherein the total content of said graphite and of said carbon black together do not exceed about 10 weight percent relative to the weight of said poly(1-monoolefin).

12. A pipe defined by claim 10 further containing a slip agent wherein said slip agent is glycerine, an amide of a higher fatty acid, or both, and wherein the amount of glycerine present is 0.5 to 1.5 weight percent, and the amount of amide present is 0.1 to 1 weight percent.

13. The pipe defined by claim 10 further containing 1 to 5 weight percent carbon black and 0.5 to 1.5 weight percent glycerine.

* * * * *